United States Patent

Bleich

Patent Number: 5,255,916
Date of Patent: Oct. 26, 1993

[54] OPTICAL BALL SENSOR

[75] Inventor: Charles R. Bleich, Cary, Ill.

[73] Assignee: Williams Electronics Games, Inc., Chicago, Ill.

[21] Appl. No.: 988,244

[22] Filed: Dec. 9, 1992

[51] Int. Cl.⁵ .............................................. A63F 7/30
[52] U.S. Cl. ........................ 273/118 D; 273/118 R; 273/118 A; 273/127 R; 273/127 B
[58] Field of Search ................ 273/118-125, 273/127 R, 127 A, 127 B, 127 C, 127 D, 181 M, 186.3, 183.1, 371; 250/221, 227.11

[56] References Cited

U.S. PATENT DOCUMENTS

| 3,252,705 | 5/1966 | Cornberg | 273/371 X |
| 4,021,119 | 5/1977 | Stauffer | 250/221 X |
| 4,534,651 | 8/1985 | Minikane | 250/227.11 X |
| 4,935,621 | 6/1990 | Pikulski | 250/221 X |
| 4,949,972 | 8/1990 | Goodwin et al. | 273/371 |
| 4,991,846 | 2/1991 | Sondej | |
| 5,158,291 | 10/1992 | Biagi et al. | |
| 5,171,013 | 12/1992 | Dooley | 273/118 A X |
| 5,181,722 | 1/1993 | Krutsch et al. | |

Primary Examiner—V. Millin
Assistant Examiner—Raleigh W. Chiu
Attorney, Agent, or Firm—Rockey, Rifkin and Ryther

[57] ABSTRACT

The optical ball sensor consists of an optical sensor consisting of a light emitter and light detector mounted on a printed circuit board. Light from the emitter is transmitted through a light pipe across the path of travel of the ball and through another light pipe back to the detector. When a rolling pinball interrupts the light beam, a signal is delivered to the game microprocessor. The microprocessor can be programmed to respond to the signal in any number of ways, for example, the microprocessor can score points, initiate other play features and the like.

20 Claims, 2 Drawing Sheets

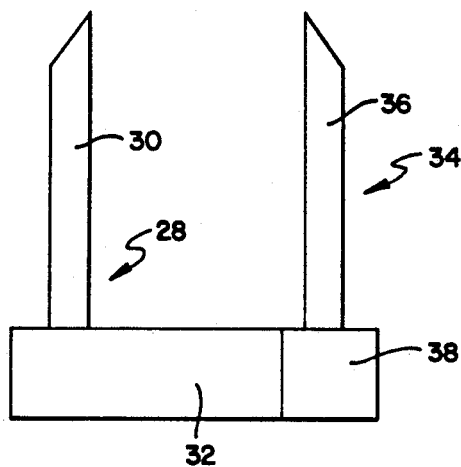
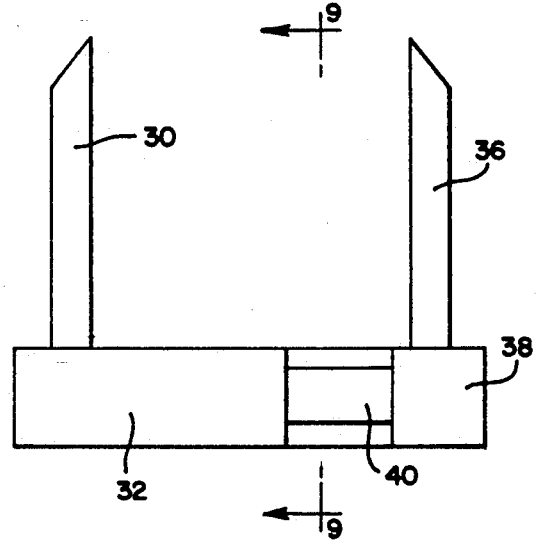
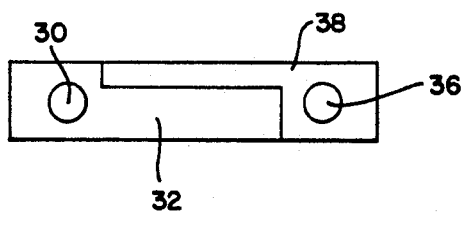
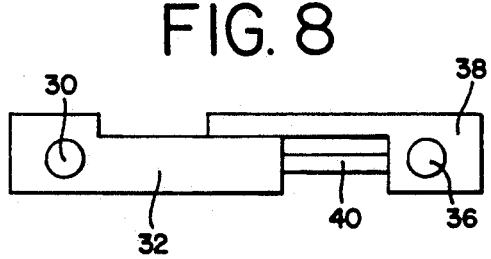
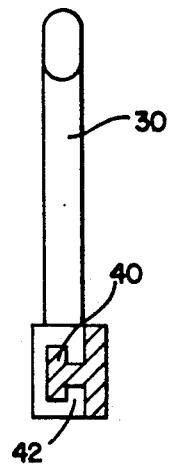

OPTICAL BALL SENSOR

BACKGROUND OF THE INVENTION

This invention relates, generally, to pinball games and, more particularly, to an optical ball sensor for such games.

Pinball games typically consist of an inclined playfield supporting a plurality of play features, a rolling ball and player operated flippers for directing the ball at the play features. One such play feature is the, so called, roll-over switch. A roll-over switch typically consists of a wire or other activator extending through an aperture in the playfield. The switches are located such that the ball can roll over the activator thereby depressing it to close a switch and deliver a signal to the game microprocessor.

These switches are relatively complicated and time consuming to manufacture and install because they have numerous components that must be assembled and aligned. In addition to these problems, game manufacturers have found it desirable to continually modify and improve their play features to maintain player interest in their line of games. Thus, alternatives to existing play features are continually developed. One such alternative to the mechanical roll over switch is a magnetic roll over switch disclosed in U.S. Pat. No. 4,542,905 to Hooker that has a magnetic sensor mounted below the playfield that senses the presence of a ferromagnetic ball. Moreover, an optical target assembly is disclosed in U.S. Ser. No. 07/847,355 assigned to the present assignee.

An alternative ball sensor is desired including one which avoids the need for alignment and/or periodic adjustment as was the case with prior art rollover switches.

SUMMARY OF THE INVENTION

The optical ball sensor of the invention overcomes the above-noted shortcomings of the prior art and consists of an optical sensor consisting of a light emitter and light detector mounted on a printed circuit board. Light from the emitter is transmitted through a light pipe (elongated, light conducting material) across the path of travel of the ball and through another light pipe to a detector. When a rolling pinball interrupts the light beam, a signal is delivered to the game microprocessor. The microprocessor can be programmed to respond to the signal in any number of ways, for example, the microprocessor can score points, initiate other play features and the like.

BRIEF DESCRIPTION OF THE DRAWINGS

FIGS. 5-8 are front views of a further modification of the ball detector of the invention.

FIG. 9 is a section view taken along line 7—7 of FIG. 7.

DETAILED DESCRIPTION OF THE INVENTION

Figure 1:
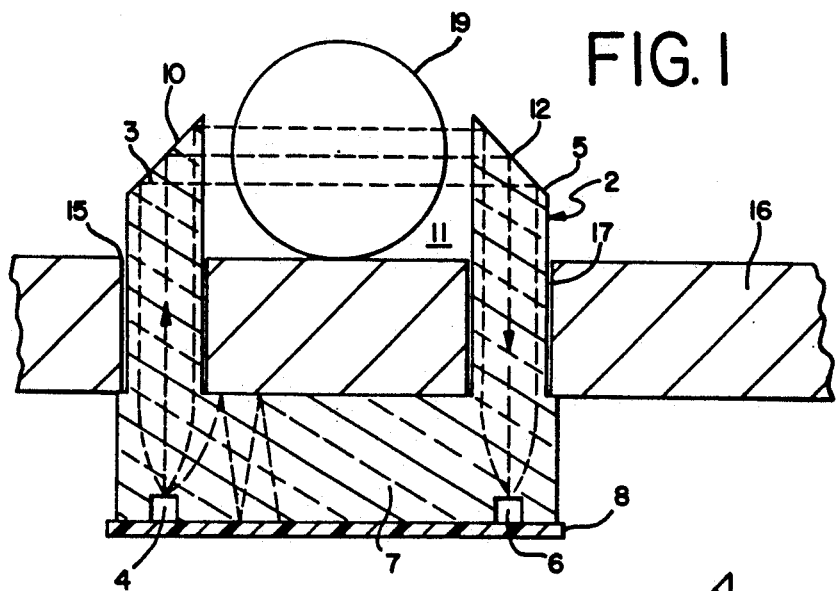
FIG. 1 is a front view of the optical ball detector of the invention.
Figure 4:
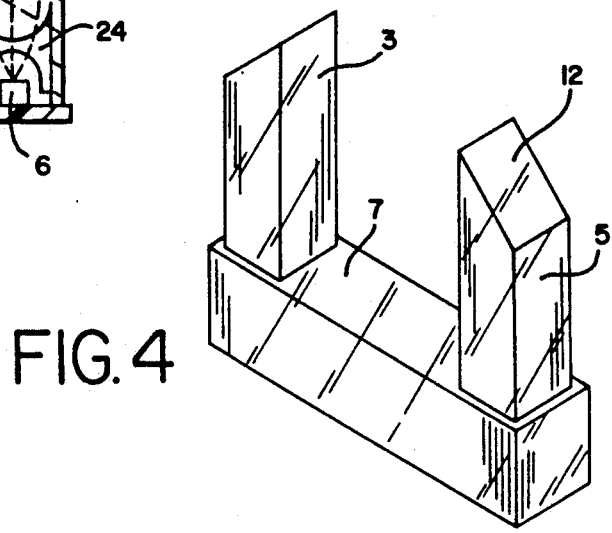
FIG. 4 is a perspective view of the optical ball detector of the invention.

The ball detector of the invention is shown in a first embodiment in FIGS. 1 and 4 and consists of light pipe 2 consisting of a piece of molded acrylic or other suitable light transmitting material including, for example, fiber optic material. Light pipe 2 has a substantially U-shape with legs 3 and 5 and transverse member 7. A light source such as an infrared light emitting diode 4 and an infrared receiver 6 are mounted on a printed circuit board 8 with the light source 4 disposed below leg 3 and receiver 6 disposed below leg 5. While in the illustrated embodiment infrared light is used, it is to be understood that light of any wave length can be used so long as the legs can transmit and the receiver 6 can detect the light.

The distal ends of legs 3 and 5 terminate in polished or mirrored surfaces 10 and 12, respectively, that are disposed at 45° angles with respect to the legs 3 and 5. As a result, the light emitted from source 4 travels through leg 3, reflects from surface 10, travels across the space 11, reflects from surface 12 and travels down leg 5 to receiver 6 as shown by the dashed lines in FIG. 1.

The legs 3 and 5 ar dimensioned to be inserted through apertures 15 and 17 formed in a playfield 16 such that the external light path is located at a distance above playfield where a ball 19 rolling on the playfield will intersect the light path. When the receiver detects the absence of light caused by the ball, it delivers a signal to the game microprocessor via conventional circuitry, a portion of which may be disposed on circuit board 8. The microprocessor acts in response to this signal as directed by the game program to score points, initiate other play features or the like. It will be apparent that the sensor can be located adjacent a ramp, tunnel or any other path of ball travel.

Figure 2:
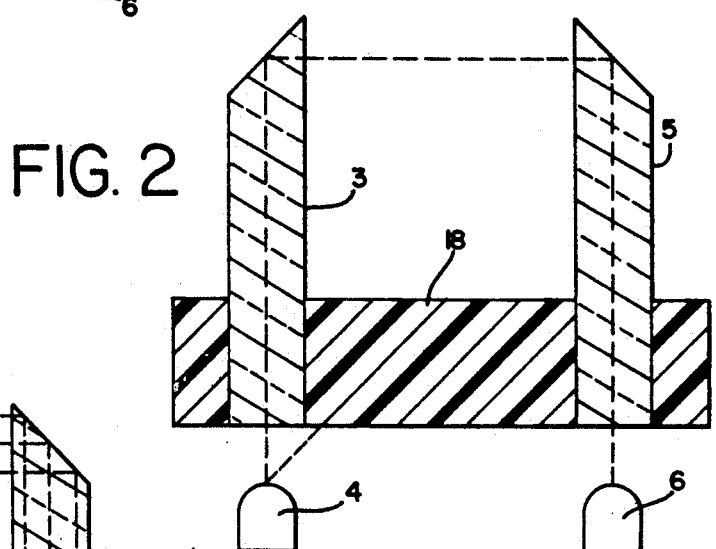
FIG. 2 shows a modification to the optical ball detector of the invention.
Figure 3:
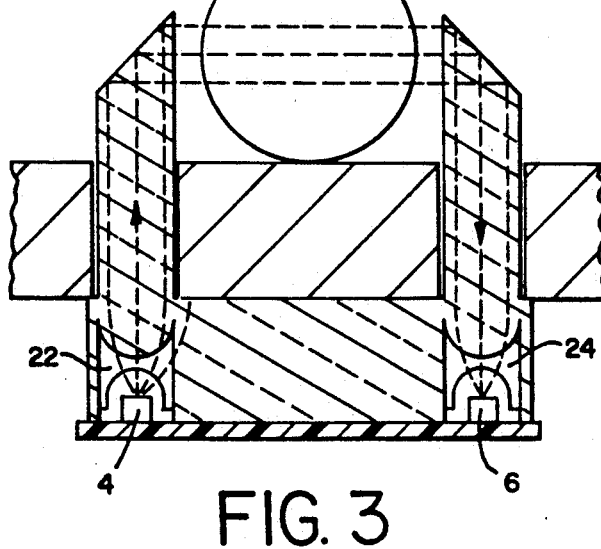
FIG. 3 shows a further modification to the optical ball detector of the invention.

A modification of the sensor is illustrated in FIG. 2 and includes legs 3 and 5 for transmitting light. The transverse member 18 is, however, made of a non-light conducting material to eliminate the possibility of light being conveyed directly from the emitter to the receiver through the transverse member as is possible in the FIG. 1 embodiment. As shown in FIG. 3, internal lenses 22 and 24 may be included in legs 3 and 5 to further focus the light and permit less diffusion from the light source 4 and provide better light gathering by the receiver 6. Finally, the legs 3 and 5 can assume other shapes so long as light is capable of being transmitted therethrough. For example, semi-circular segments of fiber optic material could be used.

Referring more particularly to FIGS. 5 through 8 a further modification of the ball sensor of the invention is shown. The sensor includes a first L-shaped piece 28 consisting of leg 30 and transverse member 32 and a second L-shaped piece 34 consisting of a leg 36 and transverse member 38. Transverse members 32 and 38 include mating tongue and groove structure that allows pieces 28 and 34 to move relative to one another to vary the distance between legs 30 and 36. Specifically, transverse member 38 is provided with a T-shaped tongue 40 that is received by the substantially C-shaped groove 42 formed on member 32 as best shown in FIG. 9. FIGS. 5 and 6 show the sensor with the legs 30 and 36 close together and FIGS. 7 and 8 show the sensor with the legs separated. This arrangement allows the sensor to be used in different applications where the various game designs necessitate that the width of the sensor be different without having to manufacture a different sized sensor for each application.

While the invention has been described in some detail with respect to the drawings, it will be appreciated that numerous changes in the details and construction of the invention can be made without departing from the spirit and scope of the invention.

What is claimed is:

1. An optical ball sensor assembly for use with a rolling ball game having an inclined playfield supporting a plurality of play features and a rolling ball, comprising:
   a) a first light pipe, one end of switch is disposed above the playfield;
   b) a source of light associated with said first light pipe;
   c) a second light pipe, a portion of which is disposed above the playfield and adapted to receive light transmitted from said first light pipe;
   d) light detecting means associated with said second light pipe for producing a signal in response to the absence of the light;
   e) said light pipes including means for directing the light along a path on the playfield, whereby he rolling ball may interrupt the light thereby to produce said signal; and
   f) means for varying the distance between the first light pipe and the second light pipe.

2. The optical ball sensor according to claim 1, wherein the light source consists of an infrared light emitting diode.

3. The optical ball sensor according to claim 1, wherein the means for directing the light includes means for transmitting the light externally of the light pipes.

4. The optical ball sensor according to claim 3, wherein the directing means is a polished surface at the end of the pipes externally above the playfield, said surface disposed at an angle to said pipes to reflect the light externally thereof.

5. The optical ball sensor according to claim 3, wherein he light pipe extends through an aperture formed in the playfield.

6. The optical ball sensor according to claim 1, wherein the light pipes are constructed of clear acrylic.

7. The optical ball sensor according o claim 1, wherein the light pipes include lenses for focusing the light.

8. The optical ball sensor according to claim 1, wherein the first and second light pipes are connected by a transverse member, disposed beneath the playfield.

9. The optical balls sensor according to claim 8, wherein the first and second light pipes and the transverse member are molded of a solid piece of light transmitting material.

10. The optical ball sensor according to claim 9, wherein the light transmitting material is acrylic.

11. The optical ball sensor according to claim 8, wherein the transverse member is constructed of a non-light conducting material.

12. The optical ball sensor according to claim 1, wherein the light source and the detecting means are mounted on a printed circuit board.

13. The optical ball sensor according to claim 1, wherein the means for varying includes a first transverse member connected to the first light pipe and a second transverse member connected to the second light pipe, said first and second transverse members including means for allowing relative sliding movement therebetween.

14. The optical ball sensor according to claim 13, wherein the means for allowing relative sliding movement includes a projection on one of said first or second light pipes engageable with a slot on the other of said first or second light pipes.

15. An optical ball sensor assembly for use in a pinball game having an inclined playfield supporting a plurality of play features and a rolling ball, comprising: p1 a) a light source;
   b) a first light pipe associated with said light source including means for transmitting light from said light source externally of the light pipe along path on the playfield where the light can be interrupted by a ball;
   c) a light detecting means or producing a signal in response to the absence o the light;
   d) a second light pipe associated with said light detecting means for transmitting the light to the light detecting means absent a ball being located along said path; and
   e) a transverse member connecting said first light pipe with said second light pipe to create a unitary assembly.

16. The optical ball sensor according to claim 15, wherein the first and second light pipes include a lens for focusing the light.

17. The optical ball sensor according to claim 15, wherein the first and second light pipes and the transverse member are constructed of a slid piece of light transmitting material.

18. The optical ball sensor according to claim 15, wherein the first and second light pipes and the transverse member are molded of a single piece of plastic.

19. The optical ball sensor according to claim 15, wherein the light source, first and second light pipes and light detecting means are mounted on a printed circuit board.

20. The optical ball sensor according to claim 15, wherein the light pipes extend through apertures formed in the playfield and said transverse member is disposed below said playfield.

* * * * *

UNITED STATES PATENT AND TRADEMARK OFFICE
CERTIFICATE OF CORRECTION

PATENT NO. : 5,255,916

DATED : October 26, 1993

INVENTOR(S) : Charles R. Bleich

It is certified that error appears in the above-indentified patent and that said Letters Patent is hereby corrected as shown below:

col. 3, l. 14, delete "switch" and insert therefor "which";
col. 3, l. 44, delete "he" and insert therefor "the";
col. 3, l. 48, delete "o" and insert therefor "to";
col. 3, l. 54, delete "balls" and insert therefor "ball";
col. 4, l. 23, delete "pl" and make clause a) a separate sub-paragraph;
col. 4, l. 27, between "along" and "path", insert "a";
col. 4, l. 30, delete "or" and insert therefor "for";
col. 4, l. 31, delete "o" and insert therfor "of";
col. 4, l. 44, delete "slid" and insert therfor "solid".

Signed and Sealed this

Twenty-sixth Day of April, 1994

Attest:

BRUCE LEHMAN

*Attesting Officer*   *Commissioner of Patents and Trademarks*